United States Patent [19]

Bredol et al.

[11] Patent Number: 5,558,817
[45] Date of Patent: Sep. 24, 1996

[54] GREEN-LUMINESCING ZINC SULPHIDE AND CATHODE RAY TUBE PROVIDED WITH THIS ZINC SULPHIDE

[75] Inventors: Michael Bredol, Aachen; Ulrich Kynast, Roetgen, both of Germany

[73] Assignee: U.S. Philips Corporation, New York, N.Y.

[21] Appl. No.: 310,505

[22] Filed: Sep. 22, 1994

Related U.S. Application Data

[63] Continuation of Ser. No. 49,906, Apr. 20, 1993, abandoned.

[30] Foreign Application Priority Data

May 15, 1992 [DE] Germany ............. 42 16 104.5

[51] Int. Cl.⁶ .................... C09K 11/56; C09K 11/54
[52] U.S. Cl. .................... 252/301.65; 252/301.45
[58] Field of Search .................. 252/301.65, 301.45

[56] References Cited

U.S. PATENT DOCUMENTS

| | | | |
|---|---|---|---|
| 4,038,205 | 7/1977 | Minnier et al. | 252/301.6 S |
| 4,740,728 | 4/1988 | Uchida et al. | 252/301.6 S |
| 4,925,593 | 5/1990 | Borchardt et al. | 252/301.6 S |

FOREIGN PATENT DOCUMENTS

| | | | |
|---|---|---|---|
| 2363744 | 7/1981 | Germany . | |
| 49-39586 | 4/1974 | Japan | 252/301.6 S |
| 7447273 | 5/1974 | Japan . | |
| 4-11687 | 1/1992 | Japan | 252/301.6 S |

*Primary Examiner*—Melissa Bonner
*Attorney, Agent, or Firm*—Norman N. Spain; Ernestine C. Bartlett

[57] ABSTRACT

The invention relates to a luminescent zinc sulphide of cubic structure (sphalerite) which is so activated by aluminum and copper that a green-emitting luminescent material is created. In a simple manufacturing process, high x-values of the colour point and high luminous efficacy values are achieved in that copper is added in a quantity of 200 to 450 mole ppm and aluminum in a quantity of 700 to 2000 mole ppm.

2 Claims, 1 Drawing Sheet

GREEN-LUMINESCING ZINC SULPHIDE AND CATHODE RAY TUBE PROVIDED WITH THIS ZINC SULPHIDE

This is a continuation of application Ser. No. 08/049,906, filed Apr. 20, 1993, now abandoned.

FIELD OF THE INVENTION

The invention relates to a luminescing zinc sulphide of cubic structure (sphalerite) which is activated by aluminum and copper so that a green-emitting luminescent material is created. The invention also relates to a cathode ray tube having a luminescent screen provided with this zinc sulphide.

BACKGROUND OF THE INVENTION

Such luminescent materials known from DE-B-23 63 744 are used in particular for color picture tubes. Cubic ZnS:Cu, Al (zinc blend, sphalerite) renders possible a higher luminous efficacy and a longer-wave emission than hexagonal wurtzite. Sphalerite is converted into wurtzite from 1020° C. upwards. To prevent this, the luminescent materials mentioned above must not be heated to above approximately 1000° C. during manufacture.

Such luminescent materials must have a high luminous emission power for a given intensity of the electron irradiation. Furthermore, x-values for the color point of at least 0.29 are to be aimed at, so that the luminescent materials after their application on a picture screen and the unavoidable reduction of the x-value occurring during this still have sufficient x-values (which according to the EBU standard is an x-value of approximately 0.28).

When dopants consisting of Cu and Al are employed, i.e. when exclusively Cu and Al are used as dopants, because it is desirable to avoid toxic Cd or Au which gives problems with manufacturing technology, it has been possible until now to introduce only comparatively small proportional quantities of Cu and Al if a still sufficient brightness were to be safeguarded. In that case, however, only comparatively small x-values at the lower limit of the admissible range were possible.

SUMMARY OF THE INVENTION

The invention has for its object the provision of a luminescent material of the kind mentioned in the opening paragraph, i.e., of luminescing zinc sulphide of cubic structure (sphalerite) which is activated by aluminum and copper so that a green-emitting luminescent material is formed which renders possible the attainment of high x-values of the color point as well as a high luminous efficacy in conjunction with a simple manufacture. Preferably x-values for the color point of at least 0.29 are attained.

This object is achieved in that copper is added in a quantity of 200 to 450 mole ppm and aluminum in a quantity of 700 and 2000 mole ppm, and in that the mole ppm ratio of aluminum to copper is from 2 to 5.

x/y-coordinates of the color point are achieved with luminescent materials according to the invention which lie within the quadrangle according to the EBU standard, defined by the coordinates [0.320/0.605], [0.286/0.610], [0,280/0,542] and [0.280/0.610].

It should be noted that the luminous efficacy decreases with increasing doping concentration, although nevertheless particularly high brightness values are achieved within the range defined according to the invention. It has been found that the brightness values in this range are increased by approximately 10% by means of a subsequent annealing treatment within the range of 300° to 500° C., preferably at 450° C. in air (500° C. should not be exceeded). Such an annealing treatment need not necessarily be carried out as an additional step in the process, because temperatures in the 450° range usually act on the luminescent layer anyway during the manufacture of a luminescent screen. When copper is added in a quantity of 280 to 420 mole ppm and aluminum in a quantity of 850 to 1200 mole ppm, sufficiency high brightness values are achieved without special manufacturing measures. Outside this range, measures for achieving a quicker cooling-down of the reaction mixture of the basic materials brought to temperatures of below 1000° C. are advisable in the manufacture of the luminescent material. Given the requisite accuracy, extremely high brightness values can then be achieved, although indeed the reproducibility and a narrow spread can only be guaranteed at a high manufacturing cost.

It has been found that high x-values of the color point and simultaneous high brightness values are achieved when the mole ppm ratio of aluminum to copper is between 2 and 5.

BRIEF DESCRIPTION OF THE DRAWING

The invention will be described in more detail below with reference to the description of embodiments and the drawing.

DETAILED DESCRIPTION OF THE PREFERRED EMBODIMENTS

Figure 1:
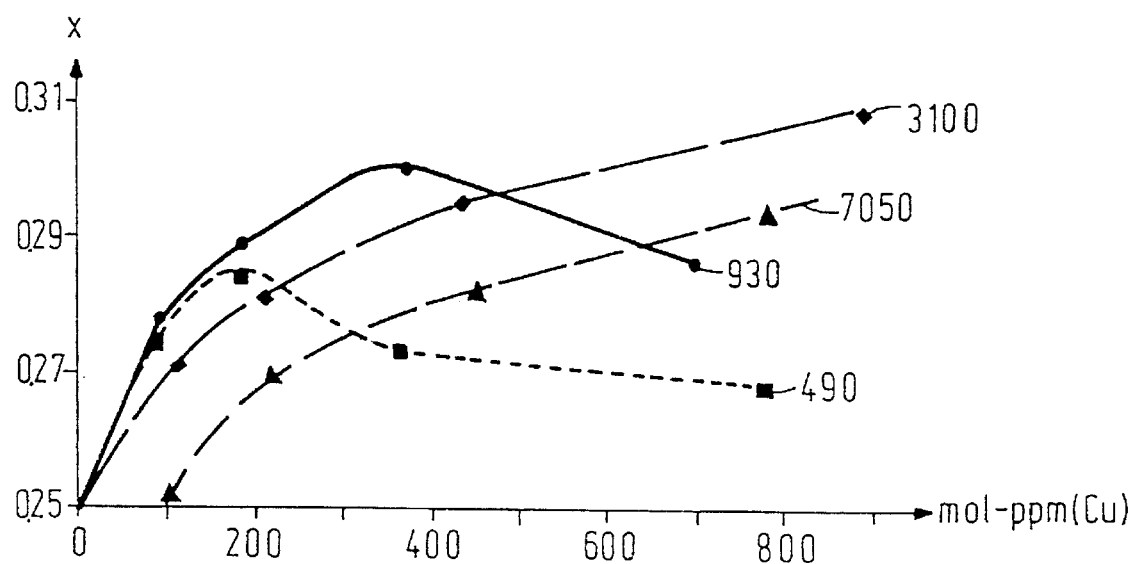
FIG. 1 shows the measured x-values as a function of the relative Cu quantity for various relative Al quantities.

A plurality of luminescent material samples with various Al and Cu quantities was investigated. The Table below lists the most important data for a few of these samples with the numbers 1 to 21 and 1a, 5a, 11a, 16a and 20a. The samples 1 and 1a contain doping quantities of Cu and Al which are in accordance with the present state of the art.

The relative quantities of Cu and Al in mole ppm indicate how many Cu or Al atoms were present in a total number of $10^6$ Zn+Cu+Al atoms.

The brightness values in lm/W and the color points were measured at 12 kV and 5 nA. The color coordinates are indicated in usual manner with x and y.

The samples 1, 5, 6, 11 and 20 were given a final annealing treatment at 450° C. As a result of this, the values change as indicated for the samples having the same numbers in the Table with the suffix a. It is apparent that the annealing treatment on the one hand leads to a small reduction in the x-value, but on the other hand provides substantially higher brightness values.

TABLE

| Sample No. | ppm (Cu) | ppm (Al) | lm/W | x | y |
|---|---|---|---|---|---|
| 1 | 150 | 700 | 86 | 0.282 | 0.622 |
| 2 | 0 | 3100 | 18 | 0.151 | 0.178 |
| 3 | 110 | 3100 | 58 | 0.271 | 0.615 |
| 4 | 210 | 3100 | 63 | 0.281 | 0.613 |
| 5 | 430 | 3100 | 54 | 0.295 | 0.609 |
| 6 | 890 | 3100 | 40 | 0.309 | 0.601 |
| 7 | 0 | 7050 | 14 | 0.157 | 0.175 |
| 8 | 100 | 7050 | 64 | 0.252 | 0.601 |

TABLE-continued

| Sample No. | ppm (Cu) | ppm (Al) | lm/W | x | y |
| --- | --- | --- | --- | --- | --- |
| 9 | 220 | 7050 | 58 | 0.270 | 0.603 |
| 10 | 450 | 7050 | 50 | 0.282 | 0.606 |
| 11 | 780 | 7050 | 40 | 0.294 | 0.600 |
| 12 | 0 | 490 | 23 | 0.151 | 0.191 |
| 13 | 90 | 490 | 81 | 0.274 | 0.621 |
| 14 | 180 | 490 | 80 | 0.284 | 0.619 |
| 15 | 360 | 490 | 67 | 0.273 | 0.618 |
| 16 | 780 | 490 | 43 | 0.268 | 0.614 |
| 17 | 0 | 930 | 20 | 0.153 | 0.200 |
| 18 | 90 | 930 | 76 | 0.278 | 0.621 |
| 19 | 180 | 930 | 77 | 0.289 | 0.618 |
| 20 | 370 | 930 | 72 | 0.300 | 0.615 |
| 21 | 700 | 930 | 67 | 0.286 | 0.618 |
| 1a | 150 | 700 | 87 | 0.279 | 0.621 |
| 5a | 430 | 3100 | 61 | 0.287 | 0.514 |
| 6a | 890 | 3100 | 45 | 0.301 | 0.609 |
| 11a | 780 | 7050 | 45 | 0.284 | 0.607 |
| 20a | 370 | 930 | 77 | 0.291 | 0.617 |

The reference samples 1 and 1a make clear that the additional annealing treatment leads to practically no increase in the emission brightness with a conventional doping quantity.

All samples listed in the Table were manufactured in the same way. First ZnS (luminescence quality) was slurried together with approximately 10% sulphur by weight in distilled water. The S quantity, however, is not critical and should lie between 1 and 10% by weight. A solution of aluminum acetylacetonate (in a quantity to suite the relevant sample) is stirred into this slurry with a little methanol, inspissated until dry, and then dried for a few hours at approximately 120° C. in a drying stove. Approximately 10 g of this dry material was slurried in distilled water for a sample and mixed with the quantity of a solution of copper (II) acetylacetonate as desired for the sample. The slurry was then again inspissated until dry and finally dried at approximately 120° C. in the drying stove.

The basic material thus prepared was introduced into a quartz tube, covered with a thick layer of active carbon and fired in a tubular furnace. To adjust an even firing atmosphere, heating-up was carried out slowly (advantageously within 60 minutes). After the firing temperature of approximately 980° C. had been reached, it was maintained for about 120 minutes. Since cooling-down must not take place too slowly, the tubes were quenched in icewater.

FIG. 1 shows the x-values of the samples 2 to 21 (Table) plotted against the relative Cu quantity. Curves are shown for relative Al quantities 490, 930, 3100 and 7050 mole ppm.

Figure 2:
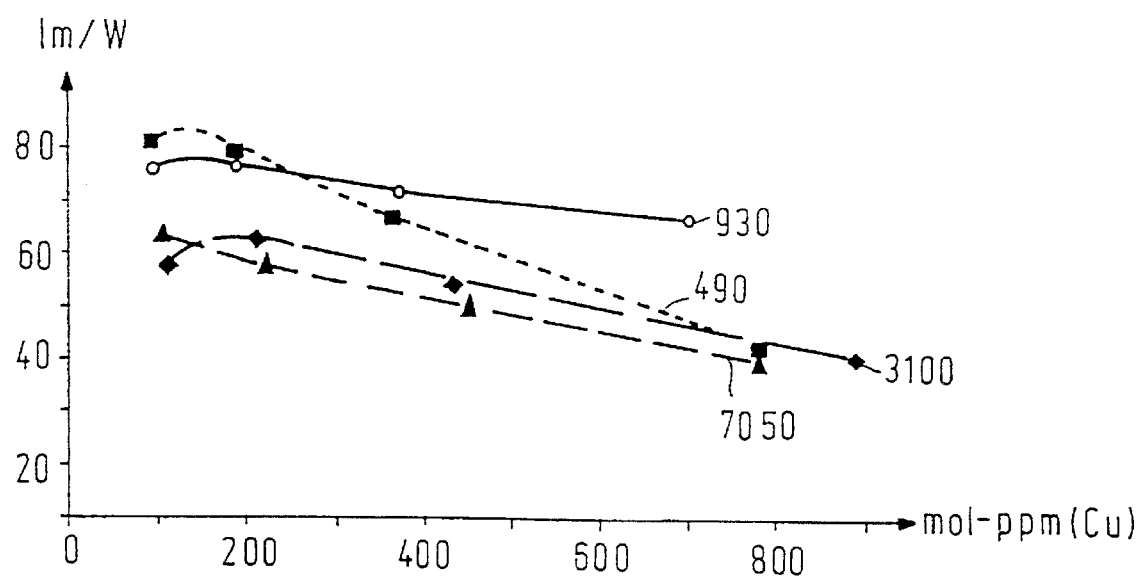
FIG. 2 shows the accompanying brightness values.

In FIG. 2, not the x-values as in FIG. 1 but the accompanying brightness values (1 m/W) are plotted. Here, too, curves are assigned to the relevant Al quantities.

The curves of FIG. 1 and FIG. 2 show that the x-values and at the same time the brightness values of the luminescent materials according to the invention are high. In addition, the brightness values of luminescent materials according to the invention can be increased by approximately 10% compared with the values shown in FIG. 2 by a final annealing treatment.

The brightness values shown in FIG. 2 were achieved without measures for extremely fast cooling-down from the firing temperature (980° C.) having to be taken. The cooling-down times observed in the manufacture of the samples listed in the Table can be realized without problems and without considerable manufacturing cost even in the case of mass manufacture, without showing an unacceptable spread in the data of the luminescent materials.

Good x-values and high brightness values can be achieved with fewer dopants in the samples by means of extremely fast (but less well reproducible) cooling-down. For example, a sample with 50 mole ppm Cu and 500 mole ppm Al yielded the values x=0.30, y=0.62 and 80 lm/W.

We claim:

1. A method of manufacturing a luminescing zinc sulfide of cubic structure which is activated by dopants consisting of aluminum and copper so that a green-emitting luminescent material is created in which copper is present in a quantity of 200–450 mole ppm and aluminum is present in a quantity of 700–2000 mole ppm, the mole ppm ratio of aluminum to copper is from 2 to 5 and said zinc sulfide has x-values for the color point of at least 0.29 and brightness values of at least 70 m/W, said method comprising reacting zinc sulfide with dopants consisting of an aluminum and a copper compound, heating the resultant product at an elevated temperature below 1000° C. and then annealing said product at a temperature of 300° C.–500° C.

2. The method of claim 1 wherein copper is present in a quantity of 280–420 mole ppm and aluminum is present in a quantity of 850–1200 mole ppm.

* * * * *